United States Patent
Akgun et al.

(10) Patent No.: US 7,146,152 B2
(45) Date of Patent: Dec. 5, 2006

(54) APPARATUS FOR USING A MODIFIED QUEUE TO FACILITATE GROUP COMMUNICATIONS

(75) Inventors: Ali Akgun, Chicago, IL (US); Michael Borella, Naperville, IL (US)

(73) Assignee: Utstarcom, Incorporated, Alameda, CA (US)

( * ) Notice: Subject to any disclaimer, the term of this patent is extended or adjusted under 35 U.S.C. 154(b) by 0 days.

(21) Appl. No.: 11/187,579

(22) Filed: Jul. 22, 2005

(65) Prior Publication Data

US 2005/0254468 A1    Nov. 17, 2005

Related U.S. Application Data

(63) Continuation of application No. 10/616,849, filed on Jul. 10, 2003.

(51) Int. Cl.
*H04M 11/00* (2006.01)
*H04Q 7/20* (2006.01)

(52) U.S. Cl. .................................................... 455/403

(58) Field of Classification Search ................ 455/403; 370/337
See application file for complete search history.

(56) References Cited

U.S. PATENT DOCUMENTS

2005/0009550 A1 *  1/2005  Akgun et al. ................ 455/518
2005/0254468 A1 * 11/2005  Akgun et al. ................ 370/337

* cited by examiner

*Primary Examiner*—William D. Cumming
(74) *Attorney, Agent, or Firm*—Fitch, Even, Tabin & Flannery

(57) ABSTRACT

While one node (such as a wireless mobile node) facilitates a point-to-multipoint communication via a communications network (10), communication requests from other nodes in the multipoint audience are queued in a node queue (17). At some point (in a preferred approach, at the conclusion of the transmission by the one node), and typically for a predetermined amount of time, communication requests are further noted. These more recent indicia of a desire to communicate are then utilized to modify the node queue. Subsequent communications are then arranged, at least in part, based upon the modified node queue.

7 Claims, 3 Drawing Sheets

APPARATUS FOR USING A MODIFIED QUEUE TO FACILITATE GROUP COMMUNICATIONS

RELATED APPLICATIONS

This is a continuation of prior application Ser. No. 10/616,849, filed Jul. 10, 2003, which is hereby incorporated herein by reference in its entirety.

TECHNICAL FIELD

This invention relates generally to two-way communications and particularly to verbal group communications.

BACKGROUND

Two-way verbal communications are well known in the art. In a full-duplex two-way communication (as with standard landline or cellular telephone technology), both parties to a conversation are technically able to transmit their own verbalizations and to receive the other party's statements simultaneously if they so wish. Such capability usually permits each party to well accommodate the ordinary dynamics of human verbal interchange.

There are some applications, however, when the enabling technology is less accommodating to the shifting dynamics of verbal exchanges. For example, some wireless and wireline systems will facilitate a group communication amongst a plurality of nodes (such as wireless mobile nodes) by permitting only a single node to source audio content which audio content is then provided to the remaining plurality of listening nodes. When the sourcing node concludes its transmission the system will then typically permit another of the nodes to initiate a new transmission for reception, again, by the other nodes. Often, however, contention occurs for this reply capability; that is, more than one of the available nodes will then attempt to communicate and/or otherwise indicate a desire to communicate to the group of nodes. Since multiple nodes cannot simultaneously verbally communicate in such a system, such contention must be resolved or chaos may ensue.

One simple approach has been to provide a queue. Communication requests are queued as received with a next communication opportunity being extended to a most highly queued node. Such an approach has the benefit of relative simplicity, and may provide satisfactory performance in some restricted settings. In general, however, such an approach does not well reflect and accommodate the ordinary dynamics of verbal communication, particularly in a group setting. For example, a first party listening to a verbal presentation may initially wish to ask a question regarding a particular point made by the speaker. This first party may then express their desire to speak (in order to pose their question) and, when they are the first listener to express this desire, they will be placed relatively high in the queue. Upon continuing to listen to the speaker, however, the first party may discover that their point of interest is later covered in sufficient detail such that they no longer wish to express their question. When such an event occurs, however, this party will continue to retain their relatively highly queued position. This, in turn, can lead to delay, confusion, and/or a misallocation of resources within the communication system.

This and numerous other examples make clear that previously known contention-resolving queues will not typically accommodate, track, reflect, or abet the ordinary and expected dynamics of group verbal discourse.

BRIEF DESCRIPTION OF THE DRAWINGS

The above needs are at least partially met through provision of an apparatus for using a modified queue to facilitate group communications described in the following detailed description, particularly when studied in conjunction with the drawings, wherein.

Figure 1:
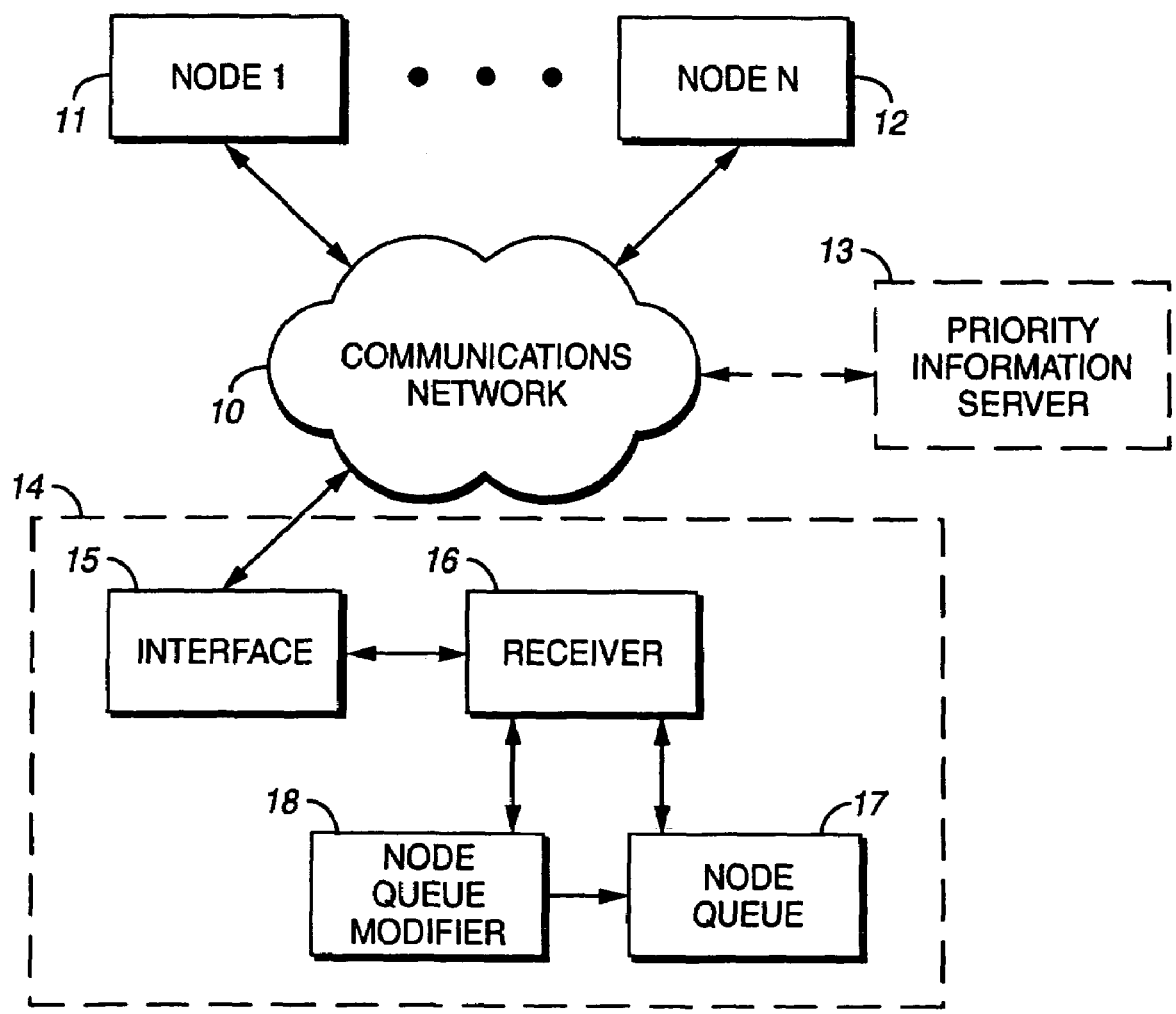
FIG. 1 comprises a block diagram as configured in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, while a first node communicates via a communication network to a group comprising a plurality of other nodes, a determination occurs that at least some of the other nodes desire to communicate to the group. Such nodes are queued in a queue. Then, pursuant to a preferred embodiment, at a time subsequent to when the first node is communicating to the group, another determination is made as to whether any of the other nodes have recently indicated a desire to communicate to the group. At least some part of the previously populated queue is then modified in accordance with predetermined criteria and as a function, at least in part, of any such recently expressed desires to communicate to the group to thereby provide a modified queue. That modified queue can then be used to facilitate a communication via the communication network from a node that comprises a part of the group to other nodes in the group.

Pursuant to one embodiment, at least some of the nodes comprise wireless mobile nodes. In a preferred approach, the nodes indicate their desire to communicate by sourcing at least one corresponding communication by, for example, transmitting a corresponding data request in a form that is compatible with the signaling and resource allocation protocols of the communication network;

In a preferred approach, subsequent resource allocation will tend to favor a node that is both an early (relative to other nodes) resource requester and that has also expressed a resource request within a relevant recent context (such as, for example, within a 5 second window that begins with the conclusion of the transmission from the original speaking party). Various modifications are possible. For example, other prioritization information (such as individually assigned priority grades as accorded to at least one or more of the contending nodes) can be utilized to additionally influence and/or weight the queue modification criteria and process.

So configured, a queue-based next-speaker identification process can be readily effected. Although queue-based, the resultant process will nevertheless tend to track in a more intuitive way the ebb and flow of group communications dynamics than has been heretofore realized. Furthermore, this basic approach is compatible with a significant number of variations that permit further customization to suite the specific needs of a given group, communication, network, or the like.

Referring now to the drawings, and in particular to FIG. 1, a communications network 10 (such as, for example, an extranet such as the Internet, an enterprise intranet, or the like) serves, in part, to facilitate communications (using, for example, packet switch data protocols and techniques as well understood in the art) amongst and between a plurality of user nodes. For example, node 111 can transmit a message via this communications network 10 to node N 12 (which message can comprise user data that corresponds, for example, to a text message, an audio message, or any other content as may be desired, appropriate, and/or supported by the network 10 and the nodes).

As noted earlier, in some cases, a point-to-multipoint communication may be supported by the communications network 10. In such a communication, one node (such as node 111) simultaneously transmits a message, such as a packetized voice message, to a plurality of receiving nodes, such as node 2 (not shown) through node N 12. Such a point-to-multipoint communication serves well to accommodate the communications needs of a group of users (for example, a group of workers at a construction site, a group of students and instructors in a virtual classroom setting, a group of businesspeople in a virtual meeting setting, and so forth) where the resource requirements of full-duplex capability may be either unnecessary, undesirable, economically inadvisable, or simply unavailable.

In some such settings, at least some of the nodes may have one or more predetermined (or dynamically assigned) priorities assigned thereto. For example, for a group comprised of a number of construction workers at a work site, a chief foreman may have a highest priority level of "1," three foremen may have a middle tier priority level of "2," and the remaining workers may have a low tier priority level of "3." These priority ratings, when available, can be used to influence the selection of a next speaker. Such priority information can be assigned and retained at each individual node or, if desired, can be optionally retained in a remote source such as a priority information server 13 (such as, but not limited to, an authorization, authentication, and accounting platform, a session initiation protocol registrar, a packet data service node, a push-to-talk server, a home agent, or a session initiation protocol server as are understood in the art) and accessed when and as needed. Other prioritization schemes that correlate predetermined priority information with given nodes (or category of nodes) exist and may be utilized as well as desired and/or as appropriate to a given application.

Pursuant to an illustrative preferred approach, an apparatus 14 having a suitable interface 15 can also operably couple to the communications network 10. A suitable receiver 16 then couples to the interface 15 and thereby attains the ability to receive at least some of the communications and/or signaling as are sourced by the various nodes of the group. This receiver 16 in turn operably couples to both a node queue 17 and a node queue modifier 18.

The node queue 17 serves, at least in part, to retain a queue of nodes that have indicated a desire to communicate to other nodes in the group during a time when one of the nodes is communicating to the group. For example, while a first user speaks to the other members of the group via these nodes and the communications network 10, other users can indicate their desire to speak (to, for example, ask a question, seek clarification of a presented point, or to challenge a particular statement) by, for example, keying a push-to-talk button on their node platform in accordance with well understood prior art technique. Corresponding signaling as sourced by a keyed node will be received at the receiver 16 and can be used to place an identifier for the transmitting node into the node queue 17. So configured, for example, the node queue 17 can provide a simple chronological listing of each node that has sourced such a request. In effect, the node queue 17 will essentially reflect a time related prioritization of the various nodes that have signaled a desire to communicate to the group while another of the nodes is actively so communicating. (Specific illustrative examples of a node queue will be presented below.)

The node queue modifier 18 is responsive to node transmissions and particularly, in a preferred embodiment, to transmissions that are made subsequent to when the speaking node concludes transmitting to the other nodes. As will be described below in more detail, such transmission can be used to permit modification of the contents of the node queue 17. In a preferred approach, such modifications generally tend to serve the purpose of causing the prioritization represented by the node queue 17 to better track with and otherwise reflect the evident dynamics of the group conference. Pursuant to one approach the node queue 17 will be modified by the node queue modifier 18 such that a particular node which made a transmission indicating a desire to communicate during the conference and that was also a most highly queued node in the node queue amongst other notes that also transmitted a desire to communicate subsequent to when the first node is transmitting will tend to be placed most highly in the queue and hence is most likely to be first accorded a subsequent opportunity to itself continue the group conference by sourcing its own transmission to the group.

The above elements can be configured as discrete elements and/or as an integrated whole as may suit the needs of a given application and as otherwise is well understood in the art. It should also be understood that there can be an independent platform of this sort to support a single discrete group communication or such a platform can instead track and support a plurality of groups (either in a seriatim fashion or simultaneously) and their respective communications. It would also be possible to integrate these functions into a platform that serves other purposes as well; for example, these elements can be readily incorporated into an authorization, authentication, and accounting platform, a session initiation protocol registrar, a packet data service node, a push-to-talk server, a home agent, or a session initiation protocol server as are all understood in the art.

Figure 2:
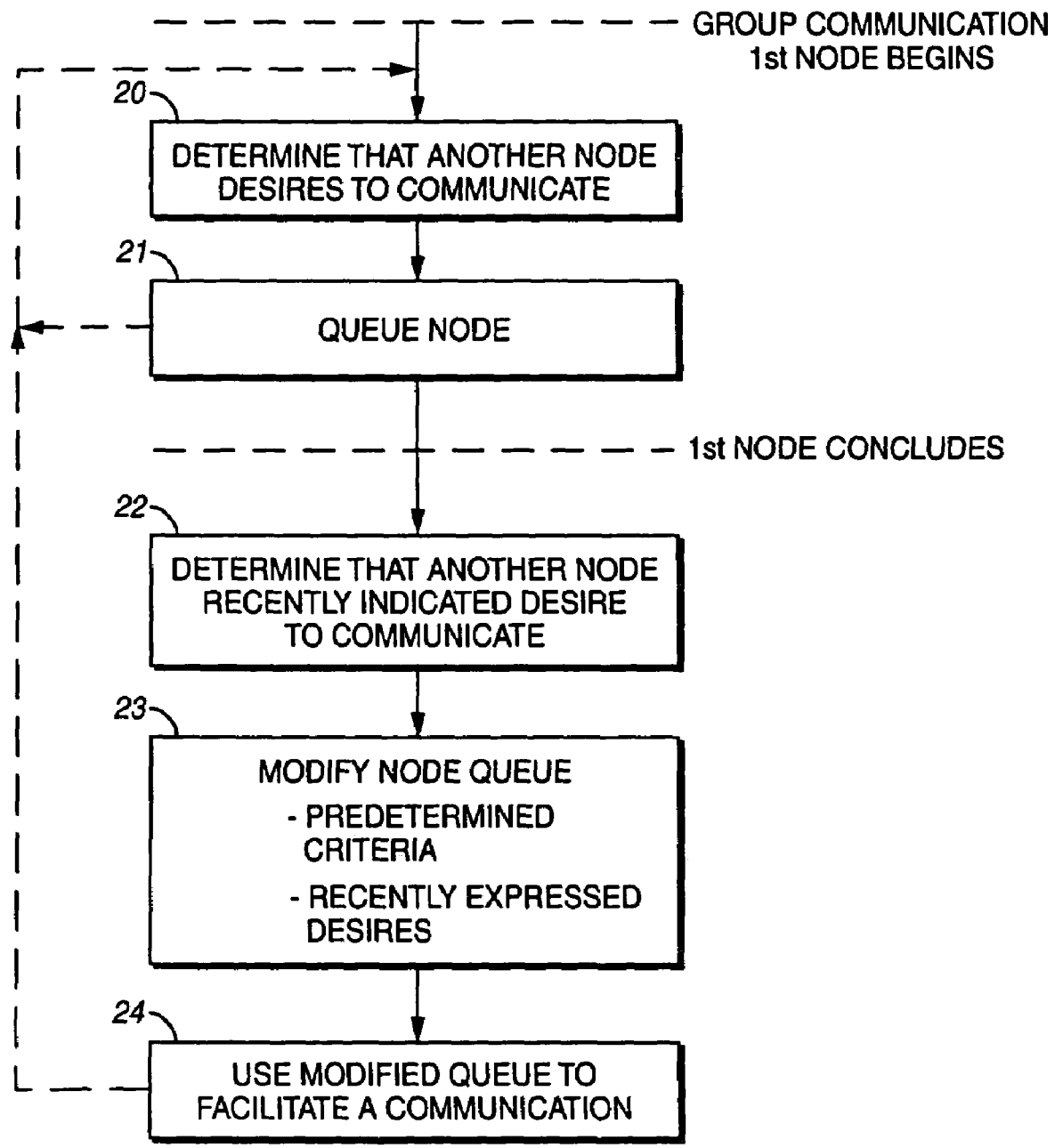
FIG. 2 comprises a flow diagram as configured in accordance with an embodiment of the invention.

Such a platform will serve to support a process that permits the populating of a node queue and the subsequent modification of that node queue to reflect the detected dynamics of a corresponding group conference. In particular, and referring now to FIG. 2, upon initiation of a group communication (as when a first node begins to transmit to the other nodes of the group) the process monitors for and determines 20 when other nodes indicate a desire to communicate. Such a desire can be evidenced in a variety of ways. For instance, an operator of a node can key the push-to-talk switch of their respective node (which action corresponds to the same action as will be taken by the operator when seeking to transmit a verbal message). Although the node can refuse to (or be prohibited from) actually transmitting the operator's voice message (if any) at that time, the node can nevertheless automatically transmit a short message that comprises an identifier for the node in conjunction with an explicit or implied request to transmit. Such a short message can be transmitted, for example, through appropriate use of a system control channel and/or a short message capability as may be supported by a given communication network.

The short message can be received by the above-described platform and utilized to permit placement of a marker in the node queue 21 that represents (directly or indirectly) this particular node. Pursuant to one approach, such identifying information is entered into the node queue as a function, at least in part, of when the nodes so indicate a desire to communicate. For example, the nodes can be queued in the order of when each node indicates the requisite desire. Depending upon the preferences of the designer, a given node may only be entered in the node queue a single time regardless of how many times that node provides such an indication (where, if desired, a given node's position in the queue can nevertheless be altered, if desired, as a function of how many times that node provides the indication of interest). As an alternative approach, a given node may be entered in the node queue with each detected indication, such that a single node can appear at multiple positions within the node queue. It would also be possible to so populate the node queue as a function of only communication requests as are received during a particular window of time having, for example, a predetermined duration. In a preferred embodiment, however, the node queue will be so populated during substantially the entire time that the first node is communicating via the communications network to the group.

As noted earlier, certain nodes may have a particular priority level associated therewith. In such a case, this priority may be used to alter the respective position of such a node in the node queue. For example, a node bearing a high predetermined priority may be accorded a high position in the node queue regardless of whether other nodes have earlier indicated the requisite desire to communicate.

In a preferred embodiment, the above described process of detecting communication indicia and queuing the corresponding node continues until the first node concludes its transmission to the group. At this time, the outbound communication resource becomes available for assignment and/or use by another node within the group. Pursuant to this embodiment, the process now determines 22 whether any of the nodes have recently indicated a desire to communicate to the group. Although it would be possible to permit this criteria of "recently" to include at least a portion of the time when the first node was transmitting its communication to the group, in a preferred approach the process determines whether any nodes express, fully subsequent to the first node's period of communication, a desire to communicate. Also in a preferred embodiment, this determination will be made with respect to recent indications that occur during a predetermined period of time (such as, for example, 1 second, 3 seconds, 5 seconds, or such other period as may be appropriate to a given application). It would of course be possible to selectively vary the duration of this time window in a dynamic fashion. For example, an initial window of 1 second could be utilized. If, however, no node makes a recent indication during this short window of time, the window could be dynamically extended for a longer period of time in order to permit at least one node to make a current expression of interest.

This information regarding recent indications is then used to modify 23 the previously populated node queue. In particular, this modification occurs in accord with such predetermined criteria as may be appropriate to a given application and as a function, at least in part, of any recently expressed desires to communicate to the group. The predetermined criteria can comprise, for example, the repositioning of at least one already queued node within the queue as a function of a recently expressed communication desire. As another example, the predetermined criteria can include a consideration of other prioritizing information as may be available, such as individual or group priority levels as described above.

The process then permits use 24 of the modified queue to further facilitate the communication. For example, a most highly queued node in the modified node queue can be provided with a first opportunity to utilize a network resource for the purpose of addressing the group. While this next speaker addresses the group, of course, this process can be repeated. Pursuant to one approach, the node queue can be cleared and begun anew with a new speaker. In another embodiment, the modified node queue can be maintained and continued with new node indications being used to further populate the modified node queue. Pursuant to yet another approach, the modified node queue can be continued with new additions as appropriate, but with an ultimate limit to the size of the queue being utilized to eventually permit culling of the node queue. For example, a first-in/first-out mechanism can be used to expunge the oldest queued nodes from the node queue when capacity issues are confronted.

So configured, prior to a first predetermined communications event (such as the conclusion of one node's transmission to a group of nodes), one determines that at least some nodes amongst a group of nodes desire to communicate to the group and then queues such nodes to provide a corresponding queue. Then, subsequent to that first predetermined communications event, one determines that at least one of the nodes has indicated a desire to communicate to the group and that information is used, at least in part, to modify the queue. The modified queue is then used to facilitate a communication via the communication network from a selected node that comprises a part of the group. This approach permits a subsequent speaker to be selected based both on their early expression of a desire to communicate (relative at least to other nodes within the group) and upon their more recent expression(s) of a desire to communicate. This in turn tends to permit, in many instances, an allocation of speaking capability that more naturally tracks the dynamics and current desires of the listening audience while also preserving, to an extent, the relative importance of their earlier expressed communication desires.

Figure 3:
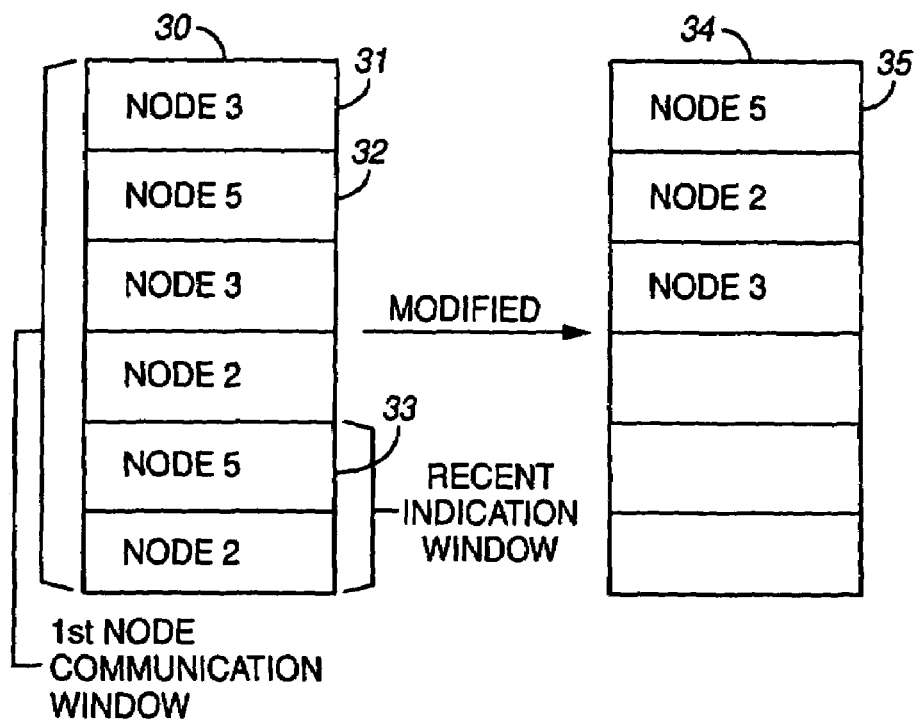
FIG. 3 comprises a schematic depiction of an illustrative node queue undergoing modification in accordance with an embodiment of the invention.

Referring now to FIG. 3, in a first illustrative example the node queue 30 includes six queue positions (in a more useful embodiment the queue would more likely include a considerably larger number of queue positions). Four of the queue positions are used, in this embodiment, to queue nodes that indicate (during another node's transmission) a desire to communicate. Node 3 occupies the highest queue position 31 because, in this embodiment, node 3 was the first node to express a desire to communicate to the group during another node's transmission. In a similar fashion, node 5 occupies a next highest queue position 32 because node 5 was the next node, after node 3, to express such a desire. (In this particular example, it can be seen that there are multiple queued entries are permitted. As noted above, such an approach comprises but one of many possible approaches to queuing.)

The remaining two node positions are used, in this embodiment, to queue those nodes that indicate, during the monitored recent indication window (such as just subsequent to when the speaking node concludes transmitting) a desire to communicate. In this example, node 5 occupies the highest queue position 33 in this secondary queue with node 2 occupying a next highest queue position.

This information can be processed in various ways as already suggested above to permit the provision of a resultant modified node queue. For purposes of this example, a most highly queued node as first queued that also appears during the recent indication window will be most highly queued in the modified queue. Therefore, as illustrated in FIG. 3, node 5 will occupy the highest queue position 35 in the modified queue 34 because node 5 is the second most highly queued node and because node 5 also made a recent indication of a desire to communicate whereas the originally most highly queued node 3 did not make such a recent indication. It can also be seen that node 2 is more highly queued in the modified queue even though node 2 was considerably less highly queued than node 3 in the original node queue. This relative queue position between node 2 and node 3 reflects node 2's more recent indicated communication desires. At the same time, however, it can be seen that although node 3 did not express a recent desire to communicate, node 3 nevertheless remains in the resource allocation queue because node 3 did earlier indicate a desire to communicate.

Figure 4:
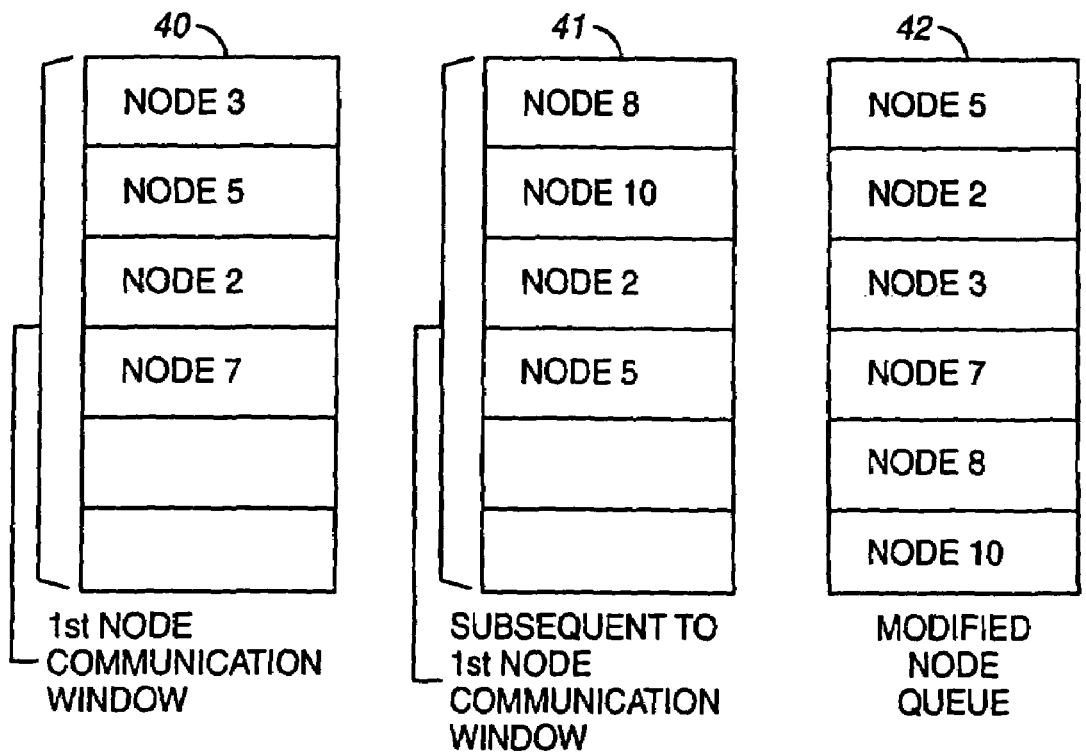
FIG. 4 comprises a schematic depiction of an illustrative node queue undergoing modification in accordance with another embodiment of the invention.

Referring now to FIG. 4, in another illustrative example, the nodes that indicate a desire to communicate during a first period of time are queued 40, such that node 3 occupies the highest queue position, followed respectively by node 5, node 2, and node 7. This first period of time can be as desired and/or appropriate to a given setting. In a preferred approach, this first period of time will correspond to the time that a given node is transmitting a communication via the communication network to a group of nodes. Then, during a second period of time, one queues 41 (or at least collects together) the nodes that indicate a desire to communicate to the group. In this example, node 8 occupies the highest queue position, followed respectively by node 10, node 2, and node 5. In a preferred approach, this second period of time will correspond to a predetermined window of time that follows the first period of time.

In this example, it can be seen that node 3 was the first node to express a desire to communicate during the first period of time. Node 3, however, did not express such a desire during the second period of time. Node 5, however, was the second node to express such a desire during the first period of time and to also express this desire during the second period of time. Although other nodes (including node 8, node 10, and node 2) expressed such an indication during the second period of time earlier than node 5, node 5 was the highest queued node from the first period of time to also indicate a desire to communicate during the second period of time. Therefore, pursuant to this embodiment, node 5 becomes the most highly queued node in the modified queue 42. So queued, node 5 will therefore be afforded the first opportunity to communicate to the group of nodes subsequent to the previous node's group transmission.

It will of course be appreciated that it may not be necessary to literally queue the nodes that express the "recent" communications desires. This is particularly so when such a queue position will not figure in the determination of a given node's position within the modified queue. Instead, it may only be necessary to maintain a simple list of those nodes that expressed the triggering indicia during the monitored window of activity.

So configured, it can be seen that a next node of a group of nodes can be selected to communicate to the group of nodes by first noting first information regarding at least some of the group of nodes that indicate a desire, during a first period of time, to communicate to the group of nodes and then to note second information regarding at least one of the group of nodes that indicates a desire, during a second period of time (which second period of time is at least partially subsequent to the first period of time) to communicate to the group of nodes. This first and second information can then be used to facilitate selection of a next node to communicate to the group of nodes. This, in turn, permits selection of a next node in a manner that is relatively flexible and responsive to the dynamics of the group communication as evidenced, at least in part, by the expressed communication desires of the group participants.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

For example, as already suggested above, instead of originally queuing the nodes as a function of their respective time of expressing their communication desire, the nodes can be queued as a function of the number of unsuccessful attempts each node has made. With such an approach, for example, a node that makes three attempts to communicate during the time when another node is transmitting will be queued higher than a node that makes only two or one such attempt, but lower than a node that makes four such attempts. And, of course, both the respective time of the indication and the number of indications made can be used in some appropriate combination (weighted or unweighted as appropriate to the needs of the given application) to effect the queuing process.

As another example of an alternative approach, a participant that expresses a desire to communicate while another participant speaks can be allowed to record their message for certain or potential playback at a later moment. The length of the recording can be essentially unlimited or limited to some static or dynamically determined length as desired. The messages can then be automatically played back and transmitted to the group in accordance with the queue as otherwise developed above. If desired, a mix of recorded and live communications can be accommodated. For example, the participant can signal whether they wish to make a recorded statement or a live statement when transmitting their request and the system can respond accordingly. In such a case, if desired, it would be possible to queue the live statements in a manner different from the queuing of the playback of the recorded messages. For example, it would be possible to queue the live statements through use of the modified queue described above while playing back the recorded messages in accordance with a simple first-in/first-out queue.

As yet another illustrative alternative approach, a voting system could be integrated with some or all of these teachings. For example, the group of participants could be permitted to vote, during some window of time, and thereby express their opinion as to which participant should next receive a speaking opportunity. Such a voting process could be used as the primary mechanism by which to select a particular node from amongst the originally queued nodes or as a secondary mechanism by which to further adjust the ordering of the modified queue described above. Such an approach might be particularly appropriate when facilitating applications where, for example, a group of participants are sharing a data stream of audio, video, or multimedia materials with one another.

We claim:

1. An apparatus comprising:
   an interface operably coupleable to a communications network used by a plurality of nodes to facilitate a conference;
   a receiver operably coupled to the interface;
   a node queue operably coupled to the receiver and having a queue of nodes that have expressed, while a first node is transmitting to the plurality of nodes during the conference, a desire to communicate to the nodes during the conference;
   a node queue modifier operably coupled to the receiver and the node queue and being responsive to transmissions from the nodes, which transmissions are made subsequent to when the first node is transmitting to the plurality of nodes during the conferences.

2. The apparatus of claim 1 wherein the apparatus comprises, at least in part, a packet data service node.

3. The apparatus of claim 1 wherein at least some of the plurality of nodes comprise wireless mobile nodes.

4. The apparatus of claim 1 wherein the node queue modifier includes modification means for modifying the queue as a function, at least in part, of the transmissions from the nodes, which transmissions are made subsequent to when the first node is transmitting to the plurality of nodes during the conference.

5. The apparatus of claim 4 wherein the transmissions made subsequent to when the first node is transmitting comprise, at least in part, requests to communicate during the conference.

6. The apparatus of claim 5 wherein the modification means is further for modifying the queue such that a particular node which made a transmission indicating a desire to communicate during the conference and that was a most highly queued node in the node queue amongst other nodes that also transmitted a desire to communicate subsequent to when the first node is transmitting will be placed most highly in the queue.

7. The apparatus of claim 1 wherein the queue of nodes further reflects non-time related prioritization as corresponds to at least one of the nodes.

* * * * *